United States Patent
Mody

Patent Number: 5,420,468
Date of Patent: May 30, 1995

[54] SHORTED TURN FOR MOVING COIL MOTORS

[75] Inventor: Hemant K. Mody, Rochester, N.Y.

[73] Assignee: Eastman Kodak Company, Rochester, N.Y.

[21] Appl. No.: 191,059

[22] Filed: Feb. 1, 1994

Related U.S. Application Data

[63] Continuation of Ser. No. 873,517, Apr. 21, 1992, abandoned, which is a continuation of Ser. No. 634,637, Dec. 27, 1990, abandoned.

[51] Int. Cl.⁶ .......................................... H02K 41/02
[52] U.S. Cl. ...................................... 310/13; 310/27; 318/135
[58] Field of Search ................. 310/12, 13, 27, 36, 310/42, 182, 190, 256; 318/135

[56] References Cited

U.S. PATENT DOCUMENTS

| | | | |
|---|---|---|---|
| 3,505,544 | 4/1970 | Helms | 318/135 |
| 3,521,092 | 7/1970 | Kalthoff | 310/13 |
| 3,656,015 | 4/1972 | Gillum | 310/13 |
| 3,723,779 | 3/1973 | Gillum | 310/13 |
| 3,778,652 | 12/1973 | Endress | 310/211 |
| 4,439,699 | 3/1984 | Brende et al. | 310/13 |
| 4,603,270 | 7/1986 | Van Davelaar | 310/13 |
| 4,685,202 | 8/1987 | Booth et al. | 29/607 |

*Primary Examiner*—Steven L. Stephan
*Assistant Examiner*—D. R. Haszko

[57] ABSTRACT

A linear motor of the type used to control the radial position of a write/read transducer relative to a rotating data storage disk comprises an elongated tubular-shaped permanent magnet which concentrically surrounds and is spaced, by an air gap, from an elongated pole piece of highly permeable material (e.g. steel). A selectively energizable coil, concentrically arranged between the magnet and pole piece, is adapted to move axially in response to an applied current. According to the invention, the pole piece supports a plurality of "shorting rings" made of high conductivity, low permeability material. The shorting rings are embedded in the pole piece so as to be coextensive with the surface thereof. The spaced shorting rings function as a "shorted turn" which operates to reduce the rise time of current applied to the coil without significantly reducing the magnetic flux in the air gap through which the coil is linearly driven.

8 Claims, 2 Drawing Sheets

SHORTED TURN FOR MOVING COIL MOTORS

This is a Continuation of application Ser. No. 873,517, filed Apr. 21, 1992, now abandoned, which is a Continuation of application Ser. No. 634,637, filed Dec. 27, 1990, now abandoned.

BACKGROUND OF THE INVENTION

The present invention relates to the field of data recording and playback. More particularly, it relates to improvements in radial access apparatus for controlling the radial position of a read/write head relative to a data storage disk, whereby the head may be moved from one data track to another to playback or record data on the disk.

Linear motors of the moving coil variety are used extensively in applications requiring linear force-current characteristics and fast response. An example of such applications is the radial access apparatus used in a conventional disk drive for moving a read/write head between the various data tracks on an optical, magneto-optical, or magnetic data storage disk. Such moving coil radial access mechanisms are disclosed, for example, in U.S. Pat. Nos. 3,521,092; 4,439,699; and 4,603,270.

FIGS. 1 and 1A illustrate the essential features of a typical moving coil linear motor M. Such device comprises a coil C wound upon one end of a tubular bobbin 10 which supports a load, shown as the read/write head 12 of a data recording system. The coil is suspended in a radial magnetic field produced by a tubular permanent magnet 14. The tubular magnet is concentrically arranged with respect to the central post 16 of a cylindrical housing 18 made of steel or other magnetically permeable material. The outer surface of magnet 14 is press fit against the inside surface 20a of a peripheral cylindrical sleeve 20 of housing 18, and a base portion 22 of the housing provides a return path for the magnetic flux F, shown in phantom line. Depending upon the direction of current flow within the coil, the coil moves in a linear direction, as indicated by the arrows A, in an air gap G defined by the inside surface of the magnetic member 14 and the exterior surface of post 16. The coil experiences a force directly proportional to the magnetic flux density B provided by magnetic member 14, and the current I in the coil, the force on the coil being normal to both B and I. As the coil moves linearly in the magnetic field, the read/write head 12 moves radially with respect to a data storage disk D, such as an optical, magneto-optical, or magnetic disk. A motor M operates through a spindle S to rotate the disk D about its central axis, while the linear motor operates to move the read/write head 12 along the disk radius to access one of the concentrically arranged data tracks on the disk.

Incremental and high speed motion control of the read/write head requires rapid changes in the magnitude and direction of the force applied to coil C. Since the flux density B is fixed, rapid changes in force imply rapid changes in current. In order to achieve a short current rise time, it is common practice to enclose the central steel post 16 with a non-magnetic, electrically conductive sleeve 24, commonly referred to as a "shorted turn." Currents induced in the shorted turn by the change in flux produced during movement of the coil act to reduce the magnetic flux diffusing into the high permeability post 16. As a result, the back emf seen at the coil terminals is reduced, thereby reducing the current rise time.

While the sleeve-shaped shorted turn shown in FIG. 1 offers the advantage of reducing the current rise time, it is disadvantageous from the standpoint that it also reduces the available flux density in the air gap. Thus, while a shorted turn of this type will increase the rate of rise of force on the coil, the final magnitude of such rise of force will be smaller, since the magnetic field is less.

SUMMARY OF THE INVENTION

In view of the foregoing discussion, an object of this invention is to provide a shorted turn configuration which acts to reduce the current rise time without substantially reducing the flux density in the gap. The moving coil linear motor of the invention is characterized by a shorted turn structure comprising a plurality of shorting rings which, according to the preferred embodiment, are spaced apart along the central post of a steel yoke and imbedded in the surface of such post so that the outside surface of each ring does not protrude above the exterior surface of the post. According to an alternative embodiment, the respective planes of the rings are inclined relative to the central axis of the post to avoid a force ripple which occurs when the rings are arranged substantially perpendicular to the post axis. A preferred low cost process for producing the shorting rings in the post surface comprises the steps of forming left and right hand threads in the post surface, and filling such threads with molten copper, aluminum, or other high conductivity, non-magnetic material.

The invention and its various advantages will become more apparent to those skilled in the art from the ensuing detailed description of preferred embodiments, reference being made to the accompanying drawings.

DETAILED DESCRIPTION OF PREFERRED EMBODIMENTS

Figure 1:
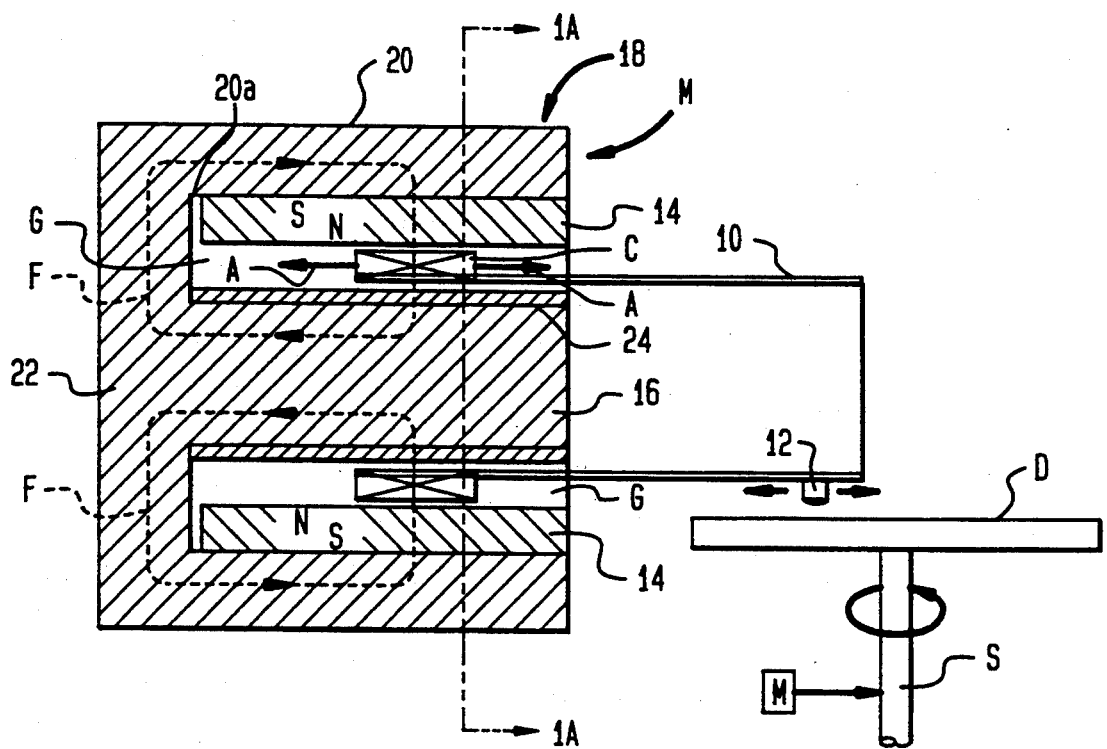
FIG. 1 schematically illustrates in cross section a voice coil linear motor of the prior art.
Figure 1A:
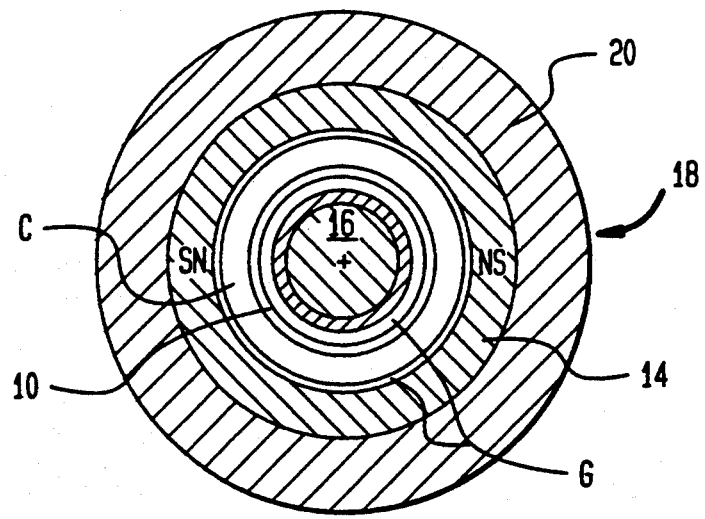
FIG. 1A is a cross sectional view of the FIG. 1 motor taken along the section line 1A—1A.
Figure 2:
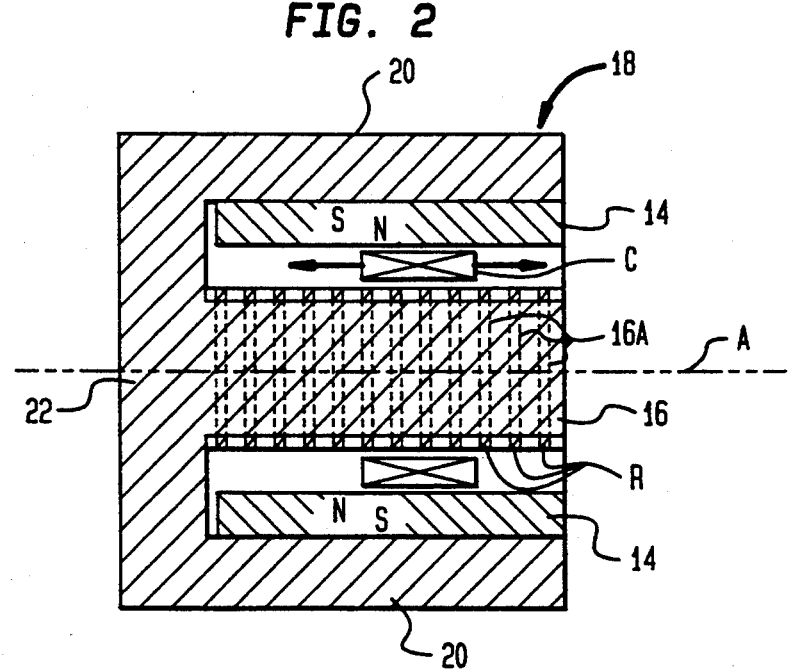
FIGS. 2 and 3 illustrate different preferred embodiments of the invention.

Referring to FIG. 2, the steel housing 18 of FIG. 1 has been modified in accordance with the present invention to include a plurality of grooves 16A in the central post portion 16. Each of these grooves is filled with a highly conductive, low-permeability material, preferably copper or aluminum, to provide a like plurality of shorting rings R. While the term "ring" often cannotes a circular configuration, it should be appreciated that the post portion may have a polygon cross section in which case the "rings" would be similarly configured.

In the shorted turn configuration of FIG. 2, the magnetic flux travels around the shorting rings, i.e., between the rings. This has the effect of increasing the surface flux density on the steel post 16, vis-a-vis the shorted turn configuration of FIG. 1. Note, however, the overall reluctance of the gap is not significantly increased, since the shorting rings are embedded in the post so that the outer surface of each ring is substantially co-planar with or slightly below the post surface. Thus, the shorting rings tend to reduce the current rise time while not significantly reducing the air gap flux.

In the FIG. 2 embodiment, the axial position of the coil with respect to the longitudinal axis A of post 16 can introduce an undesirable force ripple due to the nonuniform flux along this axis. Such nonuniformity in flux, of course, results from the fact that the post regions between the shorting rings experience a higher flux density than the regions directly underlying the rings. This force ripple can be significantly reduced by skewing the rings as shown in FIG. 3 where the rings are skewed at an angle $\alpha$, where $\alpha$ is at least equal to the arc tangent of D/d, where D is the diameter of post 16, and d is the spacing between the shorting rings.

Figure 3:
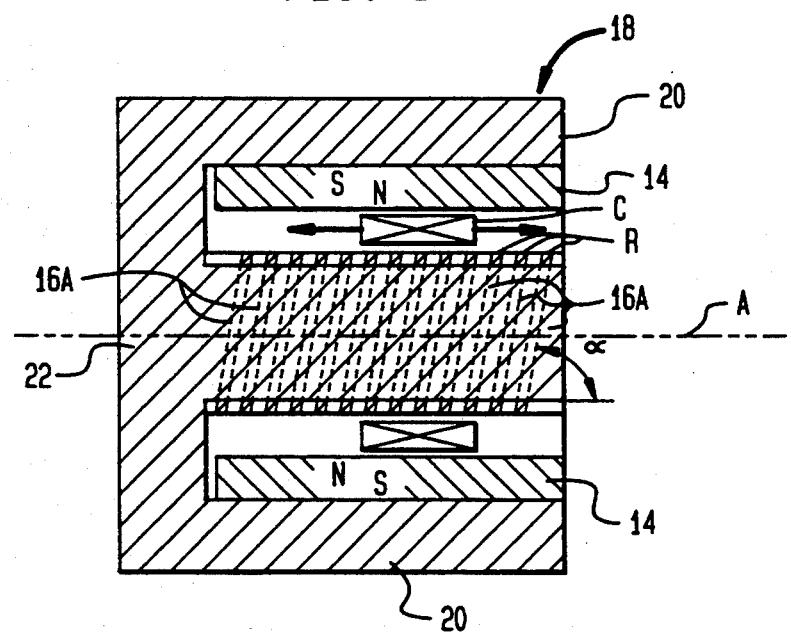
Figure 4:
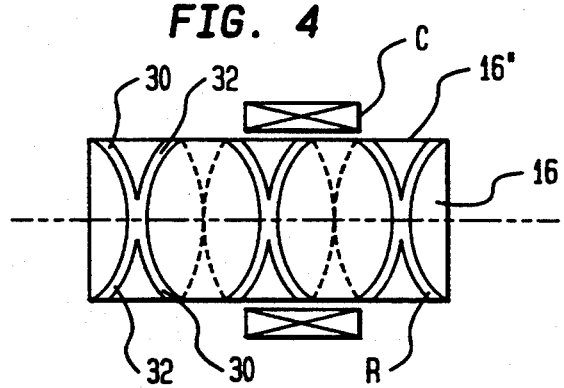
FIG. 4 illustrates an alternative embodiment in which the shorting rings of FIGS. 2 and 3 are formed by a screw-threading process.

While the multiple shorting rings shown in FIG. 2 may be formed by a routine milling operation in which grooves are cut in post 16 by rotating the post about its axis A while a cutting tool is moved perpendicular to such axis, the skewed shorting rings shown in FIG. 3 are not so easily formed. A low cost method for producing skewed shorting rings is to use a thread-cutting machine to cut both right- and left-hand threads 30, 32, on the post, as shown in FIG. 4. In all three embodiments, the cut grooves may be filled with copper or aluminum by simply dipping the post in molten metal of the type desired. Alternatively, molten metal may be poured into the cut grooves.

From the foregoing, it will be understood that an improved voice coil, linear motor has been disclosed in which multiple shorting rings serve to reduce the current rise time without significantly sacrificing air gap flux density. Such a motor is readily adapted for use in data recording systems for rapidly and precisely locating a read/write head relative to the different data tracks on a data storage disk.

The invention has been described in detail with particular reference to certain preferred embodiments thereof, but it will be understood that variations and modifications can be effected within the spirit and scope of the invention.

I claim:

1. A linear motor comprising:
   (a) a housing of magnetically permeable material, said housing having a base portion, a central post extending outwardly from said base portion, and a cylindrical outer wall extending outwardly from said base portion and concentrically surrounding said post;
   (b) a permanent magnet positioned between the endless outer wall and the central post of said housing, said magnet being spaced from said post by an air gap and being polarized to produce magnetic flux across said air gap, said air gap being adapted to receive an electric coil which, upon having an electrical current applied thereto reciprocates along an longitudinal axis of said post; and
   (c) shorted turn means for reducing the rise time of current in a coil positioned in said air gap without significantly reducing the magnetic flux in the air gap, said shorted turn means comprising oppositely spiraling conductive members supported by said post, said spiraling conductive members comprising a material of high conductivity and low magnetic permeability.

2. The apparatus as defined by claim 1 wherein said conductive members do not protrude beyond the lateral surface of said post.

3. A linear motor comprising an elongated member comprising a magnetically permeable material; an elongated permanent magnet arranged juxtaposed said elongated member and spaced therefrom by an air gap; an electrical coil surrounding said elongated member and adapted to move linearly in said air gap in a direction parallel to the longitudinal axis of said elongated member in response to an electric current flowing through said coil; and shorted turn means for reducing a current rise time within said coil without significantly reducing the magnetic flux in the air gap, said shorted turn means comprising a pair of spaced electrically conductive, non-magnetic, members spiraling about said elongated member in opposite directions to define a plurality of shorted turns along said elongated member.

4. The apparatus as defined by claim 3 wherein said conductive members are embedded in said elongated member so that respective outer surfaces of said conductive members do not protrude beyond a lateral surface of said elongated member.

5. In a data recording/playback system in which information is recorded/played back along substantially concentric data tracks on a spinning data storage disk by a record/playback transducer, a linear actuator for moving the transducer radially with respect to such disk to access a desired data track, said linear actuator comprising an elongated member comprising a magnetically permeable material; an elongated permanent magnet arranged juxtaposed said elongated member and spaced therefrom by an air gap; and electrical coil surrounding said member and adapted to move linearly within said air gap in response to an electric current flowing through said coil, said coil being rigidly coupled to said transducer; and shorted turn means mounted on said elongated member for reducing a current rise time within said coil without significantly reducing the magnetic flux in the air gap, said shorted turn means comprising a plurality of spaced, electrically conductive, non-magnetic, members supported by and spiraling about said elongated member in opposite directions to define a plurality of shorted turns along said elongated member at each intersection of said spiraling members.

6. The linear motor of claim 1 wherein said oppositely spiraling conductive members are embedded in said post by thread-cutting spiral grooves therein in opposite directions, and by dipping said post in molten material of high conductivity and low magnetic permeability to thereby fill the grooves.

7. The linear motor of claim 3 wherein said oppositely spiraling conductive members are formed by thread-cutting opposed spiral grooves around a lateral surface of said elongated member, and by dipping said elongated member in an electrically conductive, non-magnetic material to thereby fill said grooves.

8. The linear actuator of claim 5 wherein said electrically conductive, non-magnetic spiraling members are formed by thread-cutting opposed spiral grooves around a lateral surface of said elongated member, and by dipping said elongated member in an electrically conductive, non-magnetic material to thereby fill said grooves.

* * * * *